US012627154B2

(12) United States Patent
Gähler et al.

(10) Patent No.: US 12,627,154 B2
(45) Date of Patent: May 12, 2026

(54) POWER MANAGEMENT SYSTEMS AND METHODS

(71) Applicant: Siemens Schweiz AG, Zürich (CH)

(72) Inventors: Conrad Gähler, Zürich (CH); Ivo Brand, Küssnacht (CH)

(73) Assignee: SIEMENS SCHWEIZ AG, Zurich (CH)

( * ) Notice: Subject to any disclaimer, the term of this patent is extended or adjusted under 35 U.S.C. 154(b) by 379 days.

(21) Appl. No.: 18/353,431

(22) Filed: Jul. 17, 2023

(65) Prior Publication Data

US 2024/0030718 A1     Jan. 25, 2024

(30) Foreign Application Priority Data

Jul. 19, 2022    (EP) ...................................... 22185715

(51) Int. Cl.
H02J 3/38          (2026.01)
G06Q 50/06        (2024.01)
(Continued)

(52) U.S. Cl.
CPC .............. H02J 3/381 (2013.01); G06Q 50/06 (2013.01); H02J 3/003 (2020.01); H02J 2101/24 (2026.01)

(58) Field of Classification Search
CPC .............. H02J 7/00712; H02J 2203/20; H02J 2300/20; H02J 3/004; H02J 3/32
See application file for complete search history.

(56) References Cited

U.S. PATENT DOCUMENTS

| | | | |
|---|---|---|---|
| 9,438,041 B2 | 9/2016 | Roy | ............................... 700/291 |
| 10,169,832 B2 | 1/2019 | Manto | ............................ 703/18 |

(Continued)

FOREIGN PATENT DOCUMENTS

| | | | |
|---|---|---|---|
| EP | 2 993 640 | 3/2016 | ............. C08G 77/06 |
| EP | 3 748 458 | 12/2020 | ............. G05D 23/19 |

(Continued)

OTHER PUBLICATIONS

C. T. Weller; Experience with Grounded-Neutral, Y-Connected Potential Transformers on Ungrounded Systems; 18 pages, Jan. 31, 2003.

(Continued)

*Primary Examiner* — Mohammad Ali
*Assistant Examiner* — Dhruvkumar Patel
(74) *Attorney, Agent, or Firm* — Slayden Grubert Beard PLLC

(57) ABSTRACT

Various embodiments of the teachings herein include a system comprising: a local supply of renewable power; a storage device with a discharge characteristic; a switch for electrically connecting the storage device to the local supply; and a system controller. The system controller may be configured to: receive from the local supply a signal indicative of available power; read from a memory a time history of past activations of the storage device; estimate a future demand of power based on the time history; estimate a charge of the storage device based on the future demand of power and the discharge characteristic; compare the charge to the future demand of power; and if the charge is larger than the future demand of power by a predetermined margin, electrically connect the local supply of renewable power to the storage device by closing the switch.

11 Claims, 3 Drawing Sheets

(51) Int. Cl.
    *H02J 3/00*          (2026.01)
    *H02J 101/24*      (2026.01)

(56) References Cited

U.S. PATENT DOCUMENTS

| | | | |
|---|---|---|---|
| 11,532,943 B1 * | 12/2022 | Zauli ......................... | H02J 3/32 |
| 2019/0165580 A1 * | 5/2019 | Doherty ............... | G05B 13/042 |
| 2021/0156926 A1 * | 5/2021 | Knudson ................ | G06F 1/3212 |
| 2023/0139514 A1 * | 5/2023 | Tennant .................. | H02J 3/003 |
| | | | 700/291 |

FOREIGN PATENT DOCUMENTS

| | | | | |
|---|---|---|---|---|
| GB | 2592311 | 8/2021 | ............. | G05B 13/04 |
| WO | 2022 018680 | 1/2022 | ................ | H02J 3/14 |
| WO | WO-2022018680 A1 * | 1/2022 | ........ | H02J 13/00036 |

OTHER PUBLICATIONS

Leonid Grcev, Time- and Frequency-Dependent Lightning Surge Characteristics of Grounding Electrodes; 10 pages, Apr. 9, 2010.
Guenter B. Finke; Transformer Laminations, Design Considerations; 5 pages.

* cited by examiner

POWER MANAGEMENT SYSTEMS AND METHODS

CROSS-REFERENCE TO RELATED APPLICATIONS

This application claims priority to EP Application No. 22185715.4 filed Jul. 19, 2022, the contents of which are hereby incorporated by reference in their entirety.

TECHNICAL FIELD

The present disclosure relates to power systems. Various embodiments of the teachings herein include methods and/or systems for optimizing power systems such as rooftop photovoltaic systems including improved use of power from a local supply of renewable energy.

BACKGROUND

Energy management systems and/or power management systems for buildings can orchestrate supply and demand of power for buildings. More specifically, such systems optimize use of power and minimize carbon dioxide emissions by decoupling supply and demand of power. Also, orchestration of supply and demand by an energy management system or by a power management system can align with the management of a power grid. The system then contributes to improved stability of large-scale power grids.

To orchestrate supply and demand of power, energy management systems and/or power management systems control loads within a building as well as any supplies of power. An energy and/or power management system can, for example, control the charging of electric vehicles such that vehicles are charged when the cost of electricity is low. An electric vehicle may be, for example, preferentially charged at times when sufficient active and/or reactive power is available from the power grid. Also, a storage device (2a, 2b) may be charged at times when sufficient active and/or reactive power is available from the power grid.

Energy management systems and/or power management systems can also control thermal loads of a site. More specifically, energy management systems and/or power management systems can control cooling and/or heating within a building. Buildings can employ hot-water tanks to store thermal energy such as heat. Likewise, cold-water storage tanks can be employed as buffers for coolants such as water. Also, storage ovens can store thermal energy to be released during the day. An energy and/or power management system can, by way of another example, control the charging of a hot-water tank. An energy and/or power management system can, by way of yet another example, control the charging of a cold-water tank and/or of a chilled-water tank. The building can, by way of non-limiting example, be a commercial and/or an industrial and/or a residential building.

Patent application EP2993640A1 deals with a power management system including a building management system having a base load and at least one variable load. At least one variable load of the building comprises a charging point for an electric vehicle. The building management system of EP2993640A1 uses an algorithm to schedule the various loads of a building. The algorithm is employed to arrive at an optimum schedule. The algorithm accommodates various constraints such as a technical constraint of the charging point. The algorithm can, by way of non-limiting example, solve a mixed-integer linear problem. The building management system then controls supply of power to the at least one variable load in accordance the optimum schedule.

Another patent application EP3748458A1 deals with a thermal storage device controller working with local sources of renewable power. Local sources of renewable power can, by way of non-limiting example, comprise photovoltaic installations. Rather than feeding power from such sources to a grid, power from local renewable sources is employed to heat a medium inside a local thermal storage tank. A sensor is employed to determine whether the local thermal storage tank can absorb heat. Power from the renewable source is directed to the thermal storage tank in response to a positive determination. In doing so, the system avoids faulted thermal storage tanks due to overheating. According to EP3748458A1, a cooling element inside a thermal storage device can also be activated. Once again, a sensor is employed to check if the thermal storage tank can absorb the thermal energy.

SUMMARY

The instant disclosure introduces control and/or regulation by an energy and/or power management system in a building having at least one source of renewable power. The at least one source of renewable power may include a photovoltaic installation. The energy and/or power management systems as described herein can rely on forecast data to effectively use energy from a local supply of renewable power. The systems may also schedule activation and/or deactivation of a thermal storage device in accordance with the discharge characteristics of the thermal storage device. In so doing, the system of the instant disclosure also minimizes carbon dioxide footprint and/or contributes to the stability of the power grid.

For example, some embodiments of the teachings herein include a system comprising: at least one local supply of renewable power (6a, 6b, 6c), a first storage device (2a) having a first discharge characteristic, a first switch for electrically connecting the first storage device (2a) to the at least one local supply of renewable power (6a, 6b, 6c), at least one system controller (1a, 5b) having a memory and being in operative communication with the first switch and with the at least one local supply of renewable power (6a, 6b, 6c), the at least one system controller (1a, 5a, 5b) being configured to: receive from the at least one local supply of renewable power (6a, 6b, 6c) a signal indicative of available power; in response to the signal indicative of available power, read from the memory a first time history of past activations of the first storage device (2a); estimate a first future demand F1 of power based on the first time history of past activations; estimate a first charge X1 of the first storage device (2a) based on the first future demand F1 of power and based on the first discharge characteristic; compare the first charge X1 to the first future demand F1 of power; and if the first charge X1 is larger than the first future demand F1 of power by a predetermined margin, electrically connect the at least one local supply of renewable power (6a, 6b, 6c) to the first storage device (2a) by closing the first switch.

In some embodiments, the at least one system controller (1a, 5a, 5b) is configured to: connect to a weather forecast controller, data from the weather forecast controller; and estimate the first future demand F1 of power based on the first time history of past activations and based on the weather forecast data.

In some embodiments, the system additionally comprises a connector to a power grid and a grid switch for electrically connecting the at least one local supply of renewable power ($6a$, $6b$, $6c$) to the connector to the power grid, wherein the at least one system controller ($1a$, $5a$, $5b$) is in operative communication with the grid switch and is configured to: if the first charge X1 is less than the sum of the first future demand F1 and the predetermined margin electrically connect the at least one local supply of renewable power ($6a$, $6b$, $6c$) to the power grid by closing the grid switch.

In some embodiments, the first storage device ($2a$) comprises a first heat pump, wherein the first heat pump has a first coefficient of performance COP1, the first coefficient of performance COP1 being a function of a first temperature T1 inside the first storage device ($2a$), the at least one system controller ($1a$, $5a$, $5b$) being configured to: read from the memory a first lookup table mapping thermal charges Xi of the first storage device ($2a$) to first temperatures inside the first storage device ($2a$); use the first lookup table and the first coefficient of performance COP1 to produce a first charging curve of the first storage device ($2a$), the first charging curve mapping amounts of power Pi supplied to the first storage device ($2a$) to thermal charges Xi of the first storage device ($2a$); and estimate the first charge X1 of the first storage device ($2a$) based on the first future demand F1 of power and based on the first discharge characteristic and based on the first charging curve.

In some embodiments, the first storage device ($2a$) comprises a first rechargeable battery and the first discharge characteristic is a first self-discharge characteristic of the first rechargeable battery, wherein the first rechargeable battery comprises a first group of materials, wherein the at least one system controller ($1a$, $5a$, $5b$) is configured to: change the first discharge characteristic as a function of the first group of materials; and estimate the first charge X1 of the first storage device ($2a$) based on the first future demand F1 of power and based on the changed first discharge characteristic.

In some embodiments, the system further comprises a second storage device ($2b$) having a second discharge characteristic, the second storage device ($2b$) comprising a second rechargeable battery, the system comprising a second switch for electrically connecting the second storage device ($2b$) to the at least one local supply of renewable power ($6a$, $6b$, $6c$), the at least one system controller ($1a$, $1b$, $5a$, $5b$) being in operative communication with the second switch, the at least one system controller ($1a$, $1b$, $5a$, $5b$) being configured to: if the first charge X1 is less than the sum of the first future demand F1 and the predetermined margin: read from the memory a second time history of past activations of the second storage device ($2b$); estimate a second future demand F2 of power based on the second time history of past activations; estimate a second charge X2 of the second storage device ($2b$) based on the second future demand F2 of power and based on the second discharge characteristic; compare the second charge X2 to the second future demand F2 of power; and if the second charge X2 is larger than the second future demand F2 of power by the predetermined margin, electrically connect the at least one local supply of renewable power ($6a$, $6b$, $6c$) to the second storage device ($2b$) by closing the second switch.

In some embodiments, the second discharge characteristic is a second self-discharge characteristic of the second rechargeable battery, wherein the second rechargeable battery comprises a second group of materials, wherein the at least one system controller ($1a$, $1b$, $5a$, $5b$) is configured to: change the second discharge characteristic as a function of the second group of materials; and estimate the second charge X2 of the second storage device ($2b$) based on the second future demand F2 of power and based on the changed second discharge characteristic.

In some embodiments, the system further comprises a second storage device ($2b$) having a second discharge characteristic, the second storage device ($2b$) comprising a second heat pump, the system comprising a second switch for electrically connecting the second storage device ($2b$) to the at least one local supply of renewable power ($6a$, $6b$, $6c$), the at least one system controller ($1a$, $1b$, $5b$) being in operative communication with the second switch, the at least one system controller ($1a$, $1b$, $5a$, $5b$) being configured to: if the first charge X1 is less than the sum of the first future demand F1 and the predetermined margin: read from the memory a second time history of past activations of the second storage device ($2b$); estimate a second future demand F2 of power based on the second time history of past activations; estimate a second charge X2 of the second storage device ($2b$) based on the second future demand F2 of power and based on the second discharge characteristic; compare the second charge X2 to the second future demand F2 of power; and if the second charge X2 is larger than the second future demand F2 of power by the predetermined margin electrically connect the at least one local supply of renewable power ($6a$, $6b$, $6c$) to the second storage device ($2b$) by closing the second switch.

In some embodiments, the second heat pump has a second coefficient of performance COP2, the second coefficient of performance COP2 being a function of a second temperature T2 inside the second storage device ($2b$), the at least one system controller ($1a$, $1b$, $5b$) being configured to: read from the memory a second lookup table mapping thermal charges Xi of the second storage device ($2b$) to second temperatures inside the second storage device ($2b$); use the second lookup table and the second coefficient of performance COP2 to produce a second charging curve of the second storage device ($2b$), the second charging curve mapping amounts of power Pi supplied to the second storage device ($2b$) to thermal charges Xi of the second storage device ($2b$); and estimate the second charge X2 of the second storage device ($2b$) based on the second future demand F2 of power and based on the second discharge characteristic and based on the second charging curve.

In some embodiments, the at least one system controller ($1a$, $1b$, $5b$) is configured to: connect to a weather forecast controller, the weather forecast controller being located remotely from the at least one system controller ($1a$, $1b$, $5a$, $5b$); receive weather forecast data from the weather forecast controller; and estimate the second future demand F2 of power based on the second time history of past activations and based on the weather forecast data.

As another example, some embodiments include a method of using power from at least one local supply of renewable power ($6a$, $6b$, $6c$), the method comprising: receiving from the at least one local supply of renewable power ($6a$, $6b$, $6c$) a signal indicative of available power; in response to the signal indicative of available power, reading from a memory a first time history of past activations of a first storage device ($2a$); estimating a first future demand F1 of power based on the first time history of past activations; estimating a first charge X1 of the first storage device ($2a$) based on the first future demand F1 of power and based on a first discharge characteristic of the first storage device ($2a$); comparing the first charge X1 to the first future demand F1 of power; and if the first charge X1 is larger than the first future demand F1 of power by a predetermined margin producing a first signal and sending the first signal to a first switch, the first signal causing the first switch to electrically connect the at least one local supply of renewable power (6a, 6b, 6c) to the first storage device (2a).

In some embodiments, the method further comprises: if the first charge X1 is less than the sum of the first future demand F1 and the predetermined margin: reading from the memory a second time history of past activations of a second storage device (2b); estimating a second future demand F2 of power based on the second time history of past activations; estimating a second charge X2 of the second storage device (2b) based on the second future demand F2 of power and based on the second discharge characteristic; comparing the second charge X2 to the second future demand F2 of power; and if the second charge X2 is larger than the second future demand F2 of power by the predetermined margin, producing a second signal and sending the second signal to a second switch, the second signal causing the second switch to electrically connect the at least one local supply of renewable power (6a, 6b, 6c) to the second storage device (2b).

As another example, some embodiments include a computer program comprising instructions which, when the program is executed by a computer, cause the computer to carry out one or more of the methods as described herein.

As another example, some embodiments include a computer-readable medium comprising instructions which, when executed by a computer, cause the computer to carry out one or more of the methods described herein.

As another example, some embodiments include a computer-readable data carrier having stored thereon one or more of the computer programs described herein.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
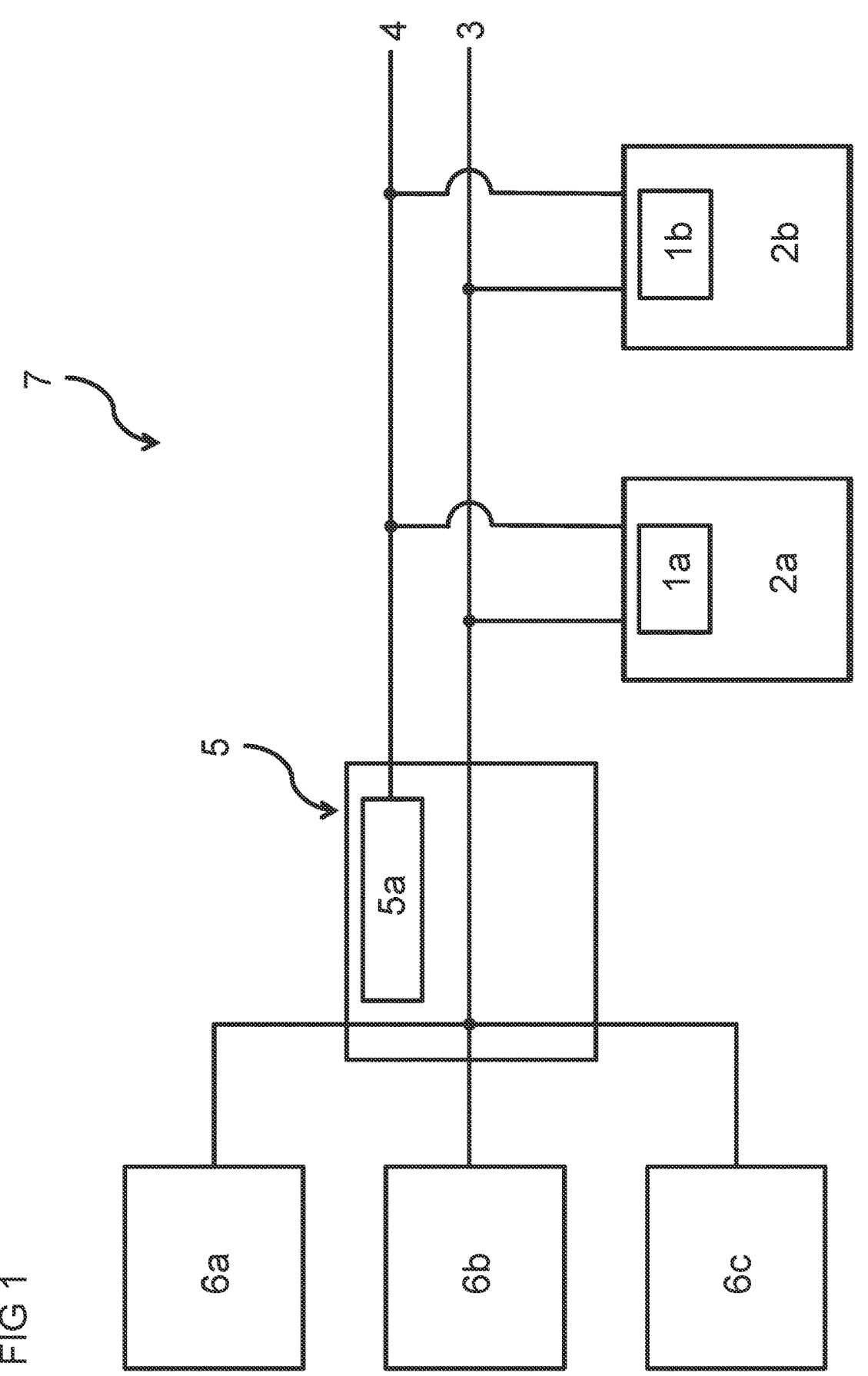
FIG. 1 is a schematic representation of a local power system having two thermal storage devices connected to the system incorporating teachings of the present disclosure.

The present disclosure deals with management of energy and/or of power originating from a local supply of renewable energy and/or of renewable power. A local power system provides a connection of the local supply of renewable energy and/or of renewable power to a first storage device. The first storage device may be local. The local power system can also provide a connection of the local supply of renewable energy and/or of renewable power to a second storage device. The local power system can be a local grid. The second storage device may be local. A system controller such as a power system controller orchestrates the management of energy and/or of power within the local power system. The system controller and/or the power system controller can comprise a remotely arranged controller such as a cloud server. The system controller and/or the power system controller can also comprise one or more controllers of the first and/or second storage devices.

When energy and/or power is available from the local supply of renewable energy and/or of renewable power, a signal is produced. The system controller and/or the power system controller receives that signal. The system controller and/or the power system controller estimates a first future demand of energy in response to the signal indicative of available energy and/or power. The first future demand may be derived from a first time history of activations of the first storage device. Characteristics of the first storage device such as a self-discharge characteristic of the first storage device are then employed to determine a first charge. The first charge represents an amount of energy to be stored in the first storage device. If the first charge is enough to satisfy the first future demand, energy and/or power from the local supply will be fed to the first storage device.

Situations may arise where the first charge is insufficient to satisfy the first future demand. The system controller and/or power system controller may then send a grid connection signal to a switch. The grid connection signal causes the switch to operate. Consequently, the energy and/or the power originating from the local supply of renewable energy and/or power is delivered to the power grid. The grid and/or the power grid encompasses a plurality of local sites such as the site having the local supply of renewable energy and/or of renewable power.

In some embodiments, the first storage device can store thermal energy and can be charged using a heat pump. In this case, the first storage of thermal energy does not only exhibit self-discharge. Also, the coefficient of performance of the heat pump needs to be factored in. For example, the coefficient of performance can be four. Accordingly, for every unit of electric energy fed to the heat pump, up to four units of energy can be stored in the storage device. The coefficient of performance generally depends on a temperature of a fluid inside the storage device.

The energy and/or power management of the present disclosure can preferably handle more than one storage device. The storage devices can be different. For example, a first storage device can store electric energy while a second storage device can store thermal energy. The energy and/or power management according to the present disclosure can accommodate a wide range of technical characteristics of such storage devices.

In some embodiments, the first charge of the first storage device can be insufficient to satisfy the first future demand. A second time history of activations of the second storage device is then obtained. A second future demand is estimated based on the second time history of activations. A second charge of the second storage device is estimated based on the second future demand and based on a discharge characteristic of the second storage device. The second charge can be enough to satisfy the second future demand, while the first charge is not enough to satisfy the first future demand. Consequently, energy and/or power from the local supply of renewable power will be fed to the second storage device.

To enable more accurate estimates of future demands of energy, a weather forecast service can be relied on. The weather forecast service delivers weather forecast data to the system controller and/or to the power system controller. The weather forecast data and the time history of past activations of the respective storage devices then form the basis of estimates of future demands of energy.

FIG. 1 shows the various principal and optional components of a local power system (7) incorporating teachings of the instant disclosure. The local power system (7) can be a local grid. The local power system (7) comprises a supply of renewable power (6a, 6b, 6c). The local supply of renewable power (6*a*, 6*b*, 6*c*) is a local supply of renewable electric power. In some embodiments, the local supply of renewable power (6*a*, 6*b*, 6*c*) comprises a photovoltaic installation and/or at least one solar panel. In some embodiments, the local supply of renewable power (6*a*, 6*b*, 6*c*) is a photovoltaic installation and/or is at least one solar panel. In another embodiment, the local supply of renewable power (6*a*, 6*b*, 6*c*) comprises a wind turbine. In some embodiments, the local supply of renewable power (6*a*, 6*b*, 6*c*) is a wind turbine.

A power bus (3) connects the supply of renewable power (6*a*, 6*b*, 6*c*) to a first storage device (2*a*). The power bus (3) can also connect the supply of renewable power (6*a*, 6*b*, 6*c*) to a second storage device (2*b*). In some embodiments, the power bus (3) electrically connects the supply of renewable power (6*a*, 6*b*, 6*c*) to a first storage device (2*a*). The power bus (3) can also electrically connect the supply of renewable power (6*a*, 6*b*, 6*c*) to a second storage device (2*b*).

In some embodiments, at least one storage device selected from the first or the second storage device (2*a*, 2*b*) comprises a thermal storage device. In some embodiments, at least one storage device selected from the first or the second storage device (2*a*, 2*b*) is a thermal storage device.

The first storage device (2*a*) can, by way of example, comprise a first hot-water tank. The first storage device (2*a*) can, by way of a special example, be a first hot-water tank. The first storage device (2*a*) can, by way of example, comprise a first cold-water tank or a first chilled-water tank. The first storage device (2*a*) can, by way of a special example, be a first cold-water tank or be a first chilled-water tank.

In some embodiments, the second storage device (2*b*) can, by way of example, comprise a second hot-water tank. The second storage device (2*b*) can, by way of a special example, be a second hot-water tank. The second storage device (2*b*) can, by way of example, comprise a second cold-water tank or a second chilled-water tank. The second storage device (2*b*) can, by way of a special example, be a second cold-water tank or be a second chilled-water tank.

In some embodiments, the two storage devices (2*a*, 2*b*) each comprise a thermal storage device. More specifically, the two storage devices (2*a*, 2*b*) both are thermal storage devices. The first storage device (2*a*) and the second storage device (2*b*) can, by way of example, both comprise a hot-water tank. The first storage device (2*a*) and the second storage device (2*b*) can, by way of another example, both be hot-water tanks. The first storage device (2*a*) and the second storage device (2*b*) can, by way of example, both comprise a cold-water tank or a chilled-water tank. The first storage device (2*a*) and the second storage device (2*b*) can, by way of another example, both be cold-water tanks or be chilled-water tanks.

In some embodiments, at least one storage device selected from the first and the second storage devices (2*a*, 2*b*) comprises an electric vehicle having a rechargeable battery. In some embodiments, at least one storage device selected from the first and the second storage devices (2*a*, 2*b*) is an electric vehicle. The electric vehicle comprises a rechargeable battery. In some embodiments, the first and the second storage devices (2*a*, 2*b*) each comprise an electric vehicle having a rechargeable battery. In some embodiments, the first and the second storage devices (2*a*, 2*b*) both are electric vehicles having rechargeable batteries.

At least one storage device selected from the first and the second storage devices (2*a*, 2*b*) can also comprise a rechargeable battery such as a redox flow battery. At least one storage device selected from the first and the second storage devices (2*a*, 2*b*) can further be a rechargeable battery such as a redox flow battery. In some embodiments, the first and the second storage devices (2*a*, 2*b*) each comprise a rechargeable battery such as a redox flow battery. The redox flow battery can, by way of non-limiting example, be installed in a commercial and/or industrial and/or residential building. The redox flow battery can, by way of another non-limiting example, be a battery of a commercial and/or an industrial and/or a residential building.

In some embodiments, the first and the second storage devices (2*a*, 2*b*) both are rechargeable batteries such as redox flow batteries. The redox flow batteries can, by way of non-limiting example, be installed in a commercial and/or industrial and/or residential building. The redox flow batteries can, by way of another non-limiting example, be batteries of a commercial and/or an industrial and/or a residential building.

In some embodiments, the first storage device (2*a*) comprises a thermal storage device. In some embodiments, the first storage device (2*a*) comprises a hot-water tank. The second storage device (2*b*) comprises an electric storage device selected from
    an electric vehicle having a rechargeable battery,
    a wall-mounted rechargeable battery, and
    a redox flow battery.
In some embodiments, the first storage device (2*a*) is a thermal storage device. In some embodiments, the first storage device (2*a*) is a hot-water tank. The second storage device (2*b*) is an electric storage device selected from
    an electric vehicle having a rechargeable battery,
    a wall-mounted rechargeable battery, and
    a redox flow battery.
In some embodiments, the first storage device (2*a*) comprises a thermal storage device. In some embodiments, the first storage device (2*a*) comprises a cold-water tank. The second storage device (2*b*) comprises an electric storage device selected from
    an electric vehicle having a rechargeable battery,
    a wall-mounted rechargeable battery, and
    a redox flow battery.
In some embodiments, the first storage device (2*a*) is a thermal storage device. In some embodiments, the first storage device (2*a*) is a cold-water tank. The second storage device (2*b*) is an electric storage device selected from
    an electric vehicle having a rechargeable battery,
    a wall-mounted rechargeable battery, and
    a redox flow battery.
In some embodiments, the first storage device (2*a*) comprises a thermal storage device. In some embodiments, the first storage device (2*a*) comprises a chilled-water tank. The second storage device (2*b*) comprises an electric storage device selected from
    an electric vehicle having a rechargeable battery,
    a wall-mounted rechargeable battery, and
    a redox flow battery.
In some embodiments, the first storage device (2*a*) is a thermal storage device. In some embodiments, the first storage device (2*a*) is a chilled-water tank. The second storage device (2*b*) is an electric storage device selected from
    an electric vehicle having a rechargeable battery,
    a wall-mounted rechargeable battery, and
    a redox flow battery.
In some embodiments, the second storage device (2*b*) comprises a thermal storage device. In some embodiments, the second storage device (2b) comprises a hot-water tank. The first storage device (2a) comprises an electric storage device selected from an electric vehicle having a rechargeable battery,
a wall-mounted rechargeable battery, and
a redox flow battery.

In some embodiments, the second storage device (2b) is a thermal storage device. In some embodiments, the second storage device (2b) is a hot-water tank. The first storage device (2a) is an electric storage device selected from an electric vehicle having a rechargeable battery,
a wall-mounted rechargeable battery, and
a redox flow battery.

In some embodiments, the second storage device (2b) comprises a thermal storage device. In some embodiments, the second storage device (2b) comprises a cold-water tank. The first storage device (2a) comprises an electric storage device selected from an electric vehicle having a rechargeable battery,
a wall-mounted rechargeable battery, and
a redox flow battery.

In some embodiments, the second storage device (2b) is a thermal storage device. In some embodiments, the second storage device (2b) is a cold-water tank. The first storage device (2a) is an electric storage device selected from an electric vehicle having a rechargeable battery,
a wall-mounted rechargeable battery, and
a redox flow battery.

In some embodiments, the second storage device (2b) comprises a thermal storage device. In some embodiments, the second storage device (2b) comprises a chilled-water tank. The first storage device (2a) comprises an electric storage device selected from an electric vehicle having a rechargeable battery,
a wall-mounted rechargeable battery, and
a redox flow battery.

In some embodiments, the second storage device (2b) is a thermal storage device. In some embodiments, the second storage device (2b) is a chilled-water tank. The first storage device (2a) is an electric storage device selected from an electric vehicle having a rechargeable battery,
a wall-mounted rechargeable battery, and
a redox flow battery.

In some embodiments, the local grid (7) also comprises a power management system (5) such as an energy management system and/or a building management system. In some embodiments, the power management system (5) operates the local grid (7). The power management system (5) communicates with controllers (1a, 1b) of the storage devices (2a, 2b) via a communication bus (13).

In some embodiments, the controller (1a) of the first storage device (2a) comprises a microcontroller and/or a microprocessor. In some embodiments, the controller (1a) of the first storage device (2a) is a microcontroller and/or is a microprocessor. In some embodiments, the controller (1a) of the first storage device (2a) comprises a memory such as a non-volatile memory.

In some embodiments, the controller (1b) of the second storage device (2b) comprises a microcontroller and/or a microprocessor. In some embodiments, the controller (1b) of the second storage device (2b) is a microcontroller and/or is a microprocessor. The controller (1b) of the second storage device (2b) preferably comprises a memory such as a non-volatile memory.

In some embodiments, the power management system (5a) comprises a microcontroller and/or a microprocessor. In some embodiments, the power management system (5a) is a microcontroller and/or is a microprocessor. In some embodiments, the power management system (5a) comprises a memory such as a non-volatile memory.

Figure 2:
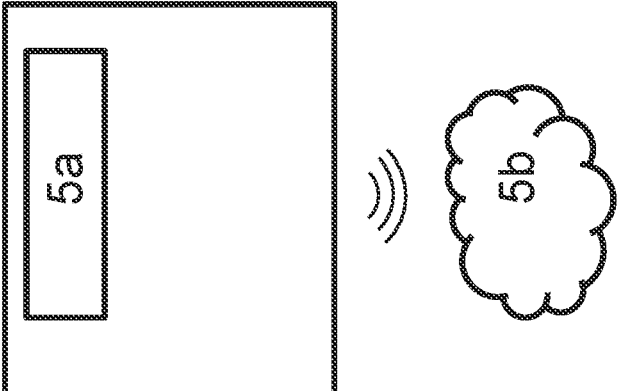
FIG. 2 shows a power system controller having a remote controller such as a cloud controller incorporating teachings of the present disclosure.

In some embodiments, the power management system (5b) can comprise a controller arranged remotely from the local supply of renewable power (6a, 6b, 6c). A power management system (5b) having such a remote controller is illustrated in FIG. 2. The controller of the power management system (5b) is also arranged remotely from the first storage device (2a). The controller of the power management system (5b) is further arranged remotely from the second storage device (2b). The controller of the power management system (5b) may be arranged at least one kilometer from the local supply of renewable power (6a, 6b, 6c). The controller of the power management system (5b) may be also arranged at least one kilometer from the first and second storage devices (2a, 2b). The controller (5b) can comprise a microprocessor and is preferably a cloud computing arrangement. The remote controller of the power management system (5b) may comprise a memory such as a non-volatile memory.

In some embodiments, the power management system (5b) can also be a controller that is arranged remotely from the local supply of renewable power (6a, 6b, 6c). The controller of the power management system (5b) is also arranged remotely from the first storage device (2a). The controller of the power management system (5b) is further arranged remotely from the second storage device (2b). The controller of the power management system (5b) may be arranged at least one kilometer from the local supply of renewable power (6a, 6b, 6c). The controller of the power management system (5b) may be also arranged at least one kilometer from the first and second storage devices (2a, 2b). The controller (5b) can be a microprocessor and is preferably a cloud computing arrangement. In some embodiments, the remote controller of the power management system (5b) comprises a memory such as a non-volatile memory.

Communication between the power management system (5a, 5b) and the controller (1a) of the first storage device (2a) may involve a digital communication bus (4). Communication between the power management system (5a, 5b) and the controller (1a) of the first storage device (2a) may involve a digital communication protocol. In some embodiments, communication between the power management system (5a, 5b) and the controller (1b) of the second storage device (2b) involves a digital communication bus (4). In some embodiments, communication between the power management system (5a, 5b) and the controller (1b) of the second storage device (2b) involves a digital communication protocol.

In some embodiments, the connection between the power management system (5a, 5b) and the controller (1a) of the first storage device (2a) can be bidirectional. A bidirectional connection affords flexibility. The connection between the power management system (5a, 5b) and the controller (1a) of the first storage device (2a) can also be unidirectional. Communication from the power management system (5a, 5b) to the controller (1a) of the first storage device (2a) is achieved by such a unidirectional connection. A unidirectional connection reduces complexity.

In some embodiments, the connection between the power management system (5a, 5b) and the controller (1b) of the second storage device (2b) can be bidirectional. A bidirectional connection affords flexibility. The connection between the power management system (5a, 5b) and the controller (1b) of the second storage device (2b) can also be unidirectional. Communication from the power management system (5a, 5b) to the controller (1b) of the second storage device (2b) is achieved by such a unidirectional connection. A unidirectional connection reduces complexity.

In some embodiments, the power system controller (5a, 5b) comprises a local controller (5a) and a remote controller (5b). The local controller (5a) can, by way of non-limiting example, comprise an edge device. The local controller (5a) can, by way of another non-limiting example, be an edge device.

In some embodiments, the remote controller (5b) of the power management system (5a, 5b) is arranged at least one kilometer from the local supply of renewable power (6a, 6b, 6c). The remote controller (5b) of the power management system (5a, 5b) may also be arranged at least one kilometer from the first and second storage devices (2a, 2b). The local controller (5a) of the power management system (5a, 5b) may be arranged less than a hundred meters from the local supply of renewable power (6a, 6b, 6c). The local controller (5a) of the power management system (5a, 5b) is may be arranged less than a hundred meters from the first and second storage devices (2a, 2b).

In some embodiments, communication between the local (5a) and the remote (5b) controllers of the power management system (5) involves a digital communication bus. In some embodiments, communication between the local (5a) and the remote (5b) controllers of the power management system (5) involves a digital communication protocol.

Figure 3:
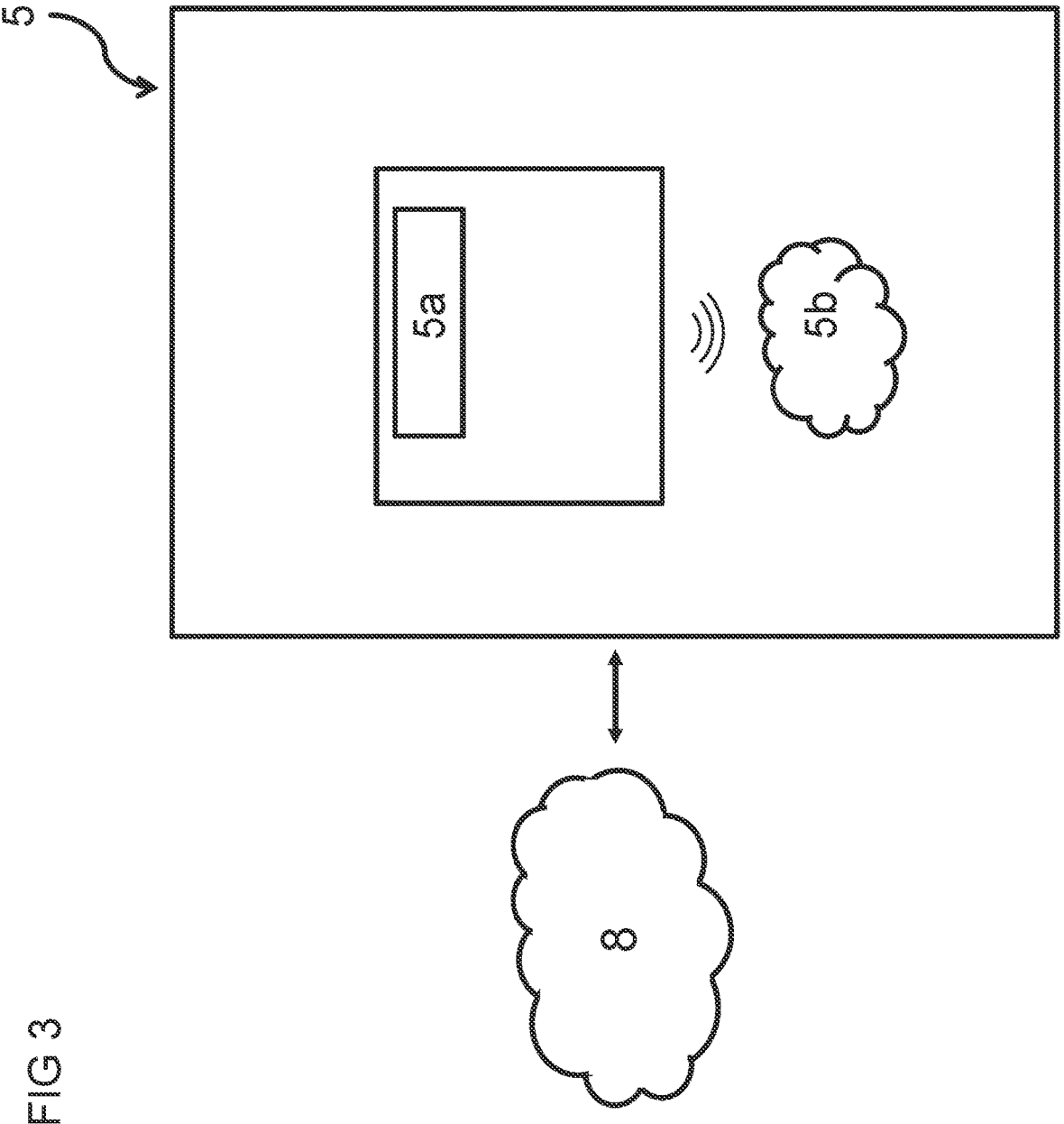
FIG. 3 illustrates communication between a power system controller and a weather forecast service incorporating teachings of the present disclosure.

In some embodiments, the power system controller (5a, 5b) is also in operative communication with a weather forecast service (8). The weather forecast service (8) can comprise a controller that is arranged remotely from the local supply of renewable power (6a, 6b, 6c). A weather forecast service (8) having such a remote controller is illustrated in FIG. 3. The controller of the weather forecast service (8) is also arranged remotely from the first storage device (2a). The controller of the weather forecast service (8) is further arranged remotely from the second storage device (2b). The controller of the weather forecast service (8) may be arranged at least one kilometer from the local supply of renewable power (6a, 6b, 6c). The controller of the weather forecast service (8) may be also arranged at least one kilometer from the first and second storage devices (2a, 2b). The controller (5b) can comprise a microprocessor and is preferably a cloud computing arrangement. In some embodiments, the controller of the weather forecast service (8) comprises a memory such as a non-volatile memory.

In some embodiments, communication between the power management system (5) and the controller of the weather forecast service (8) involves a digital communication bus. In some embodiments, communication between the power management system (5) and the controller of the weather forecast service (8) involves a digital communication protocol.

The connection between the power management system (5) and the controller of the weather forecast service (8) can be bidirectional. A bidirectional connection affords flexibility. The connection between the power management system (5) and the controller of the weather forecast service (8) can also be unidirectional. Communication from the controller of the weather forecast service (8) to the power management system (5) is achieved by such a unidirectional connection. A unidirectional connection reduces complexity.

The system controller (1a, 5a, 5b) is operable to read time history data indicative of past activations of the first storage device (2a) from a memory. The memory can be a memory of the system controller (1a, 5a, 5b). The system controller (1a, 5a, 5b) thus reads from its own memory time history data indicative of past activations of the first storage device (2a). The memory can also be a memory of the controller (1a) of the first storage device (2a). The system controller (1a, 5a, 5b) thus reads from the memory of the controller (1a) time history data indicative of past activations of the first storage device (2a).

An activation of a storage device (2a, 2b) typically means that the storage device (2a, 2b) is discharged or is charged. In some embodiments, an activation of a storage device (2a, 2b) means that the storage device (2a, 2b) is charged. In some embodiments, an activation of a storage device (2a, 2b) means that the storage device (2a, 2b) is discharged.

In some embodiments, the system controller (1b, 5a, 5b) can also be operable to read time history data indicative of past activations of the second storage device (2b) from a memory. The memory can be a memory of the system controller (1b, 5a, 5b). The system controller (1b, 5a, 5b) thus reads from its own memory time history data indicative of past activations of the second storage device (2b). The memory can also be a memory of the controller (1b) of the second storage device (2b). The system controller (1b, 5a, 5b) thus reads from the memory of the controller (1b) time history data indicative of past activations of the second storage device (2b).

The system controller (1a, 5a, 5b) then estimates a first charging state $E_1$ of the first storage device (2a). The first charging state $E_1$ is estimated as a function of the time history data indicative of past activations of the first storage device (2a). The system controller (1a, 5a, 5b) estimates a first charging state $E_1$ of the first storage device (2a). The first charging state $E_1$ is estimated as a function of the time history data indicative of past activations of the first storage device (2a). In some embodiments, the system controller (1a, 5a, 5b) calculates a first charging state $E_1$ of the first storage device (2a). The first charging state $E_1$ is calculated as a function of the time history data indicative of past activations of the first storage device (2a).

Once the time history of past activations of the first storage device (2a) has been read, the system controller (1a, 5a, 5b) can estimate a first future demand $F_1$. In some embodiments, the system controller (1a, 5a, 5b) can estimate a first future demand $F_1$ of power from the first storage device (2a). This first future demand $F_1$ of power is estimated as a function of the time history of past activations of the first storage device (2a). The system controller (1a, 5a, 5b) can also determine a first future demand $F_1$. In some embodiments, the system controller (1a, 5a, 5b) can determine a first future demand $F_1$ of power from the first storage device (2a). This first future demand $F_1$ of power is determined as a function of the time history of past activations of the first storage device (2a). The system controller (1a, 5a, 5b) can further calculate a first future demand $F_1$. In some embodiments, the system controller (1a, 5a, 5b) can calculate a first future demand $F_1$ of power from the first storage device (2a). This first future demand $F_1$ of power is calculated as a function of the time history of past activations of the first storage device (2a).

The system controller (1a, 5a, 5b) can, by way of non-limiting example, estimate that an electric vehicle shall be charged every Monday at five p.m. The system controller (1a, 5a, 5b) can also estimate that the first storage device (2a) must deliver an amount of hot water $HW_1$ at ten p.m.

In some embodiments, the system controller (1a, 5a, 5b) obtains a weather forecast data from the weather forecast service (8). In some embodiments, weather forecast data are obtained from the controller of the weather forecast service (8).

The system controller (1a, 5a, 5b) can then estimate a first future demand $F_1$. In some embodiments, the system controller (1a, 5a, 5b) can estimate a first future demand $F_1$ of power from the first storage device (2a). The estimate is based on the time history of past activations of the first storage device (2a) and on the weather forecast data. The system controller (1a, 5a, 5b) can also determine a first future demand $F_1$. In some embodiments, the system controller (1a, 5a, 5b) can determine a first future demand $F_1$ of power from the first storage device (2a). The determination is based on the time history of past activations of the first storage device (2a) and on the weather forecast data. The system controller (1a, 5a, 5b) can also calculate a first future demand $F_1$. In some embodiments, the system controller (1a, 5a, 5b) can calculate a first future demand $F_1$ of power from the first storage device (2a). The calculation is based on the time history of past activations of the first storage device (2a) and on the weather forecast data.

The system controller (1a, 5a, 5b) can, by way of non-limiting example, estimate a first future demand $F_1$ based on a predicted outside temperature of 320 Kelvin. The controller (1a, 5a, 5b) can, by way of another non-limiting example, estimate a demand $F_1$ based on a predicted outside temperature and based on a recurring pattern. The recurring pattern can be derived from the time history of past activations of the first storage device (2a).

The system controller (1b, 5a, 5b) can also estimate a second charging state $E_2$ of the second storage device (2b). The second charging state $E_2$ is estimated as a function of the time history data indicative of past activations of the second storage device (2b). In some embodiments, the system controller (1b, 5a, 5b) estimates a second charging state $E_2$ of the second storage device (2b). The second charging state $E_2$ is estimated as a function of the time history data indicative of past activations of the second storage device (2b). The system controller (1b, 5a, 5b) calculates a second charging state $E_2$ of the second storage device (2b). The second charging state $E_2$ is calculated as a function of the time history data indicative of past activations of the second storage device (2b).

Once the time history of past activations of the second storage device (2b) has been read, the system controller (1b, 5a, 5b) can estimate a second future demand $F_2$. In some embodiments, the system controller (1b, 5a, 5b) can estimate a second future demand $F_2$ of power from the second storage device (2b). This second future demand $F_2$ of power is estimated as a function of the time history of past activations of the second storage device (2b). The system controller (1b, 5a, 5b) can also determine a second future demand $F_2$. In some embodiments, the system controller (1b, 5a, 5b) can determine a second future demand $F_2$ of power from the second storage device (2b). This second future demand $F_2$ of power is determined as a function of the time history of past activations of the second storage device (2b). The system controller (1b, 5a, 5b) can further calculate a second future demand $F_2$. In some embodiments, the system controller (1b, 5a, 5b) can calculate a second future demand $F_2$ of power from the second storage device (2b). This second future demand $F_2$ of power is calculated as a function of the time history of past activations of the second storage device (2b).

The system controller (1b, 5a, 5b) can, by way of non-limiting example, estimate that an electric vehicle shall be charged every Monday at five p.m. The system controller (1b, 5a, 5b) can also estimate that the second storage device (2b) must deliver an amount of hot water $HW_2$ at ten p.m.

The system controller (1b, 5a, 5b) can also account for weather forecast data. In other words, the system controller (1b, 5a, 5b) estimates a second future demand $F_2$. In some embodiments, the system controller (1b, 5a, 5b) can estimate a second future demand $F_2$ of power from the second storage device (2b). The estimate is based on the time history of past activations of the second storage device (2b) and on the weather forecast data. The system controller (1b, 5a, 5b) can also determine a second future demand $F_2$. In some embodiments, the system controller (1b, 5a, 5b) can determine a second future demand $F_2$ of power from the second storage device (2b). The determination is based on the time history of past activations of the second storage device (2b) and on the weather forecast data. The system controller (1b, 5a, 5b) can also calculate a second future demand $F_2$. In some embodiments, the system controller (1b, 5a, 5b) can calculate a second future demand $F_2$ of power from the second storage device (2b). The calculation is based on the time history of past activations of the second storage device (2b) and on the weather forecast data.

The weather forecast data are the same for the first (2a) and for the second storage device (2b). In some embodiments, the weather forecast data are the same for the first (2a) and for the second thermal storage device (2b).

The system controller (1b, 5a, 5b) can, by way of non-limiting example, estimate a second future demand $F_2$ based on a predicted outside temperature of 320 Kelvin. The controller (1b, 5a, 5b) can, by way of another non-limiting example, estimate a demand $F_2$ based on a predicted outside temperature and based on a recurring pattern. The recurring pattern can be derived from the time history of past activations of the second storage device (2b).

In some embodiments, the system controller (1a, 1b, 5a, 5b) reads the first charging state $E_1$ of the first storage device (2a) from a memory. The memory can be a memory of the system controller (1a, 1b, 5a, 5b). The system controller (1a, 1b, 5a, 5b) thus reads from its own memory a charging state $E_1$ of the first storage device (2a). The memory can also be a memory of the controller (1a) of the first storage device (2a). The system controller (1a, 1b, 5b) thus reads from the memory of the controller (1a) a charging state $E_1$ of the first storage device (2a).

The power system controller (1a, 1b, 5a, 5b) can also read the second charging state $E_2$ of the second storage device (2b) from a memory. The memory can be a memory of the power system controller (1a, 1b, 5a, 5b). The power system controller (1a, 1b, 5b) thus reads from its own memory a charging state $E_2$ of the second storage device (2b). The memory can also be a memory of the controller (1b) of the second storage device (2b). The power system controller (1a, 1b, 5a, 5b) thus reads from the memory of the controller (1b) a charging state $E_2$ of the second storage device (2b).

A first amount of energy $X_1$ can be estimated. This first amount of energy $X_1$ is an amount of energy to be charged to the first storage device (2a). The first amount of energy $X_1$ also depends on a self-discharge characteristic of the first storage device (2a). For example, a battery of an electric vehicle will lose energy with time and a flywheel apparatus will spin down after some time. The charging state $E_1$ of the first storage device (2a) may decay exponentially with time t:

$$E_1(t) = E_1(t = 0) \cdot \exp\left(-\frac{t}{\tau_1}\right)$$

The charging state $E_1$ of the first storage device (2a) may also decay linearly with time t:

$$E_1(t) = E_1(t=0) \cdot (1 - a_1 \cdot t)$$

In addition to the self-discharge characteristic of the first storage device (2a), the effectiveness of charging can vary. The first storage device (2a) can, for example, be a first thermal storage device (2a) charged by a heat pump. The effectiveness of charging then depends on the temperature $T_1$ of a first fluid inside the first thermal storage device (2a).

The first fluid can, by way of non-limiting example, comprise water and at least one compound selected from
ethylene glycol,
propylene glycol,
propylene glycol methyl ether,
potassium formate.

In some embodiments, a coefficient of performance $COP_1$ of the first thermal storage device (2a) is a function of temperature $T_1$. Under these circumstances, an amount of power $P_1$ fed to the first thermal storage device (2a) will result in a first charge $X_1$:

$$X_1(t) = \cdot dt\, COP_1(T_1(t)) \cdot P_1(t)$$

The amount of power $P_1$ can, by way of example, originate from at least one local supply of renewable power 6a, 6b, 6c. In some embodiments, the amount of power $P_1$ substantially matches an output power of the at least one local supply of renewable power 6a, 6b, 6c. In some embodiments, the amount of power $P_1$ matches an output power of the at least one local supply of renewable power 6a, 6b, 6c.

By taking self-discharge characteristic and the effectiveness of charging the first storage device (2a) into consideration, a first multiplier $WPT_1$ can be estimated. In some embodiments, the first multiplier $WPT_1$ can be determined. In some embodiments, the first multiplier $WPT_1$ can be calculated.

The first multiplier $WPT_1$ expresses a ratio. $WPT_1$ is a ratio between a first amount of energy $\int dt\, P_1(t)$ fed to the first storage device (2a) and a first amount of charge $X_1$. Eventually, the first storage device (2a) has been charged with the first amount of energy $X_1$:

$$WPT_1 = \frac{\int dt \cdot P_1(t)}{X_1}$$

It is worth stressing that the ratio $WPT_1$ can exceed unity. That is, due to ineffective charging and/or self-discharge, only a fraction of the energy fed to the first storage device (2a) results in a charge $X_1$. For example, a ratio $WPT_1=2$ implies that half the amount of energy $WPT_1$ fed to the first storage device (2a) is lost.

The power system controller (1a, 1b, 5a, 5b) is advantageously configured to compare the first ratio $WPT_1$ to a threshold value $WPT_T$. The threshold value $WPT_T$ can, by way of non-limiting examples, be $WPT_T=2$ or $WPT_T=5$ or even $WPT_T=10$. It is envisaged that the threshold value $WPT_T$ is larger than 2 or larger than 5 or even larger than 10.

The power system controller (1a, 1b, 5a, 5b) is operable to make a first positive or first negative determination. The first positive or first negative determination is based on the comparison between the first ratio $WPT_1$ and the threshold value $WPT_T$. That is, the first storage device (2a) is charged so long as the first ratio $WPT_1$ is below the threshold value $WPT_T$. In consequence of a first positive determination to charge the first storage device (2a), a first electric switch and/or a first circuit breaker close. The first storage device (2a) thereby electrically connects to the local supply of renewable power (6a, 6b, 6c). In a similar embodiment, the first storage device (2a) is charged so long as the first ratio $WPT_1$ is below or equals the threshold value $WPT_T$. In consequence of a first positive determination to charge the first storage device (2a), a first electric switch and/or a first circuit breaker close. The first storage device (2a) thereby electrically connects to the local supply of renewable power (6a, 6b, 6c). Advantageously, first storage device (2a) galvanically connects to the local supply of renewable power (6a, 6b, 6c).

In some embodiments, the first storage device (2a) comprises the first electric switch or the first circuit breaker. The first electric switch or the first circuit breaker is in operative communication with the controller (1a) of the first storage device (2a). A first positive determination causes the power system controller (1a, 1b, 5a, 5b) to send a first close signal to the controller (1a) of the first storage device (2a). The controller (1a) of the first storage device (2a) receives the first close signal. The controller (1a) of the first storage device (2a) closes the first electric switch or the first circuit breaker in response to the first close signal. The first storage device (2a) thereby electrically connects to the local supply of renewable power (6a, 6b, 6c). In some embodiments, first storage device (2a) galvanically connects to the local supply of renewable power (6a, 6b, 6c).

A second amount of energy $X_2$ can be estimated. This second amount of energy $X_2$ is an amount of energy to be charged to the second storage device (2b). The second amount of energy $X_2$ also depends on a self-discharge characteristic of the second storage device (2b). For example, a battery of an electric vehicle will lose energy with time and a flywheel apparatus will spin down after some time. The charging state $E_2$ of the second storage device (2b) may decay exponentially with time t:

$$E_2(t) = E_2(t=0) \cdot \exp\left(-\frac{t}{\tau_2}\right)$$

The charging state $E_2$ of the second storage device (2b) may also decay linearly with time t:

$$E_2(t) = E_2(t=0) \cdot (1 - a_2 \cdot t)$$

In addition to the self-discharge characteristic of the second storage device (2b), the effectiveness of charging can vary. The second storage device (2b) can, for example, be a second thermal storage device (2b) charged by a heat pump. The effectiveness of charging then depends on the temperature $T_2$ of a second fluid inside the second thermal storage device (2b).

The second fluid can, by way of non-limiting example, comprise water and at least one compound selected from
ethylene glycol,
propylene glycol,
propylene glycol methyl ether,
potassium formate.

More specifically, a coefficient of performance $COP_2$ of the second thermal storage device (2b) is a function of temperature $T_2$. Under these circumstances, an amount of power $P_2$ fed to the second thermal storage device (2b) will result in a second charge $X_2$:

$$X_2(t) = \int dt\, COP_2(T_2(t)) \cdot P_2(t)$$

By taking self-discharge characteristic and the effectiveness of charging the second storage device (2*b*) into consideration, a second multiplier $WPT_2$ can be estimated. Advantageously, the second multiplier $WPT_2$ can be determined. Ideally, the second multiplier $WPT_2$ can be calculated.

The second multiplier $WPT_2$ expresses a ratio. $WPT_2$ is a ratio between a second amount of energy $\int dt\, P_2(t)$ fed to the second storage device (2*b*) and a second amount of charge $X_2$. Eventually, the second storage device (2*b*) has been charged with the second amount of energy $X_2$:

$$WPT_2 = \frac{\int dt \cdot P_2(t)}{X_2}$$

It is worth stressing that the ratio $WPT_2$ can exceed unity. That is, due to ineffective charging and/or self-discharge, only a fraction of the energy fed to the second storage device (2*b*) results in a second charge $X_2$. For example, a ratio $WPT_2 = 2$ implies that half the amount of energy $WPT_2$ fed to the second storage device (2*b*) is lost.

The power system controller (1*a*, 1*b*, 5*a*, 5*b*) is configured to compare the second ratio $WPT_2$ to a threshold value $WPT_T$. The threshold value $WPT_T$ can, by way of non-limiting examples, be $WPT_T = 2$ or $WPT_T = 5$ or even $WPT_T = 10$. It is envisaged that the threshold value $WPT_T$ is larger than 2 or larger than 5 or even larger than 10.

In some embodiments, the same threshold value $WPT_T$ applies to the first storage device (2*a*) and to the second storage device (2*b*). The threshold value $WPT_T$ is preferably stored in a memory such as a non-volatile memory of the power system controller (1*a*, 1*b*, 5*a*, 5*b*). The power system controller (1*a*, 1*b*, 5*a*, 5*b*) then reads the threshold value $WPT_T$ from its memory prior to the comparison. The threshold value $WPT_T$ ideally is a predetermined threshold value.

The power system controller (1*a*, 1*b*, 5*a*, 5*b*) is operable to make a second positive or second negative determination. The second positive or second negative determination is based on the comparison between the second ratio $WPT_2$ and the threshold value $WPT_T$. That is, the second storage device (2*b*) is charged so long as the second ratio $WPT_2$ is below the threshold value $WPT_T$. In consequence of a second positive determination to charge the second storage device (2*b*), a second electric switch and/or a second circuit breaker close. The second storage device (2*b*) thereby electrically connects to the local supply of renewable power (6*a*, 6*b*, 6*c*). In a similar embodiment, the second storage device (2*b*) is charged so long as the second ratio $WPT_2$ is below or equals the threshold value $WPT_T$. In consequence of a second positive determination to charge the second storage device (2*b*), a second electric switch and/or a second circuit breaker close. The second storage device (2*b*) thereby electrically connects to the local supply of renewable power (6*a*, 6*b*, 6*c*). Advantageously, second storage device (2*b*) galvanically connects to the local supply of renewable power (6*a*, 6*b*, 6*c*).

In some embodiments, the second storage device (2*b*) comprises the second electric switch or the second circuit breaker. The second electric switch or the second circuit breaker is in operative communication with the controller (1*b*) of the second storage device (2*b*). A second positive determination causes the power system controller (1*a*, 1*b*, 5*a*, 5*b*) to send a second close signal to the controller (1*b*) of the second storage device (2*b*). The controller (1*b*) of the second storage device (2*b*) receives the second close signal.

The controller (1*b*) of the second storage device (2*b*) closes the second electric switch or the second circuit breaker in response to the second close signal. The second storage device (2*b*) thereby electrically connects to the local supply of renewable power (6*a*, 6*b*, 6*c*). Advantageously, second storage device (2*b*) galvanically connects to the local supply of renewable power (6*a*, 6*b*, 6*c*).

Any elements of a method incorporating teachings of the present disclosure can be embodied in hardware and/or in a software module executed by a processor. These can also be embodied in a software module executed by a processor inside a container using operating system level virtualisation. Any method can still be embodied in a cloud computing arrangement. In some embodiments, a method is implemented in a combination of the above embodiments.

The software may include a firmware and/or a hardware driver run by the operating system and/or an application program. If implemented in software, the functions described may be stored as one or more instructions on a computer-readable medium. Storage media that can be used include, by way of non-limiting examples, random access memory (RAM) and/or read only memory (ROM) and/or flash memory. Storage media can, by way of non-limiting examples, also include EPROM memory and/or EEPROM memory and/or registers and/or a hard disk and/or a removable disk. Further storage media can, by way of non-limiting examples, include other optical disks and/or any available media that can be accessed by a computer. Storage media can still, by way of non-limiting example, include any other IT equipment and appliance.

In some embodiments, there is at least one local supply of renewable power (6*a*, 6*b*, 6*c*), a first storage device (2*a*) having a first discharge characteristic, a first switch for electrically connecting the first storage device (2*a*) to the at least one local supply of renewable power (6*a*, 6*b*, 6*c*), at least one system controller (1*a*, 5*a*, 5*b*) having a memory and being in operative communication with the first switch and with the at least one local supply of renewable power (6*a*, 6*b*, 6*c*), the at least one system controller (1*a*, 5*a*, 5*b*) being configured to: receive from the at least one local supply of renewable power (6*a*, 6*b*, 6*c*) a signal indicative of available power; in response to the signal indicative of available power, read from the memory a first time history of past activations of the first storage device (2*a*); estimate a first future demand $F_1$ of power based on the first time history of past activations; estimate a first charge $X_1$ of the first storage device (2*a*) based on the first future demand $F_1$ of power and based on the first discharge characteristic; compare the first charge $X_1$ to the first future demand $F_1$ of power; and if the first charge $X_1$ is larger than the first future demand $F_1$ of power by a predetermined margin, electrically connect the at least one local supply of renewable power (6*a*, 6*b*, 6*c*) to the first storage device (2*a*) by closing the first switch.

In some embodiments, the system comprises the local grid (7). In some embodiments, the system is the local grid (7). In some embodiments, the system comprises the local power grid (7). In some embodiments, the system is the local power grid (7).

In some embodiments, the first future demand $F_1$ of power is determined based on the first time history of past activations. In some embodiments, the first future demand $F_1$ of power is calculated based on the first time history of past activations.

In some embodiments, the first charge $X_1$ of the first storage device (2*a*) is determined based on the first future demand $F_1$ of power and based on the first discharge characteristic of the first storage device ($2a$). In some embodiments, the first charge $X_1$ of the first storage device ($2a$) is calculated based on the first future demand $F_1$ of power and based on the first discharge characteristic of the first storage device ($2a$).

The at least one system controller ($1a$, $5a$, $5b$) may be configured to: compare the first charge $X_1$ to the first future demand $F_1$ of power; and if the first charge $X_1$ is larger than the first future demand $F_1$ of power by the predetermined margin, produce a first signal and send the first signal to the first switch, the first signal causing the first switch to electrically connect the at least one local supply of renewable power ($6a$, $6b$, $6c$) to the first storage device ($2a$).

In some embodiments, the at least one system controller ($1a$, $5a$, $5b$) is configured to: connect to a weather forecast controller, the weather forecast controller being located remotely from the at least one system controller ($1a$, $5a$, $5b$); receive weather forecast data from the weather forecast controller; and estimate the first future demand $F_1$ of power based on the first time history of past activations and based on the weather forecast data. The weather forecast affords a more accurate estimate or determination or calculation of the first future demand $F_1$ of power. The weather forecast data are preferably indicative of a weather forecast at the at least one local supply of renewable power ($6a$, $6b$, $6c$).

In some embodiments, the at least one system controller ($1a$, $5a$, $5b$) is configured to: connect to a weather forecast controller, the weather forecast controller being located remotely from the at least ones system controller ($1a$, $5a$, $5b$); receive weather forecast data from the weather forecast controller; and determine the first future demand $F_1$ of power based on the first time history of past activations and based on the weather forecast data.

In some embodiments, the at least one system controller ($1a$, $5a$, $5b$) is configured to: connect to a weather forecast controller, the weather forecast controller being located remotely from the at least one system controller ($1a$, $5a$, $5b$); receive weather forecast data from the weather forecast controller; and calculate the first future demand $F_1$ of power based on the first time history of past activations and based on the weather forecast data.

In some embodiments, the system additionally comprises a connector to a power grid and a grid switch for electrically connecting the at least one local supply of renewable power ($6a$, $6b$, $6c$) to the connector to the power grid, wherein the at least one system controller ($1a$, $5a$, $5b$) is in operative communication with the grid switch and is configured to: if the first charge $X_1$ is less than the sum of the first future demand $F_1$ and the predetermined margin, electrically connect the at least one local supply of renewable power ($6a$, $6b$, $6c$) to the power grid by closing the grid switch.

In some embodiments, the system having a connector to a power grid, wherein the at least one system controller ($1a$, $5a$, $5b$) is configured to: if the first charge $X_1$ is less than the sum of the first future demand $F_1$ and the predetermined margin, produce a grid connection signal and send the grid connection signal to the grid switch, the grid connection signal causing the grid switch to electrically connect the at least one local supply of renewable power ($6a$, $6b$, $6c$) to the power grid.

In some embodiments, the first storage device ($2a$) comprises a first heat pump, wherein the first heat pump has a first coefficient of performance $COP_1$, the first coefficient of performance $COP_1$ being a function of a first temperature $T_1$ inside the first storage device ($2a$), the at least one system controller ($1a$, $5a$, $5b$) being configured to: read from the memory a first lookup table mapping thermal charges $X_1$ of the first storage device ($2a$) to first temperatures inside the first storage device ($2a$); use the first lookup table and the first coefficient of performance $COP_1$ to produce a first charging curve of the first storage device ($2a$), the first charging curve mapping amounts of power $P_1$ supplied to the first storage device ($2a$) to thermal charges $X_1$ of the first storage device ($2a$); and estimate the first charge $X_1$ of the first storage device ($2a$) based on the first future demand $F_1$ of power and based on the first discharge characteristic and based on the first charging curve.

When the system accommodates various charging curves of heat pumps, the system becomes more versatile. That is, the characteristics of various types of heat pumps can be taken into consideration.

In some embodiments, the first storage device ($2a$) comprises a first heat pump, wherein the first heat pump has a first coefficient of performance $COP_1$, the first coefficient of performance $COP_1$ being a function of a first temperature $T_1$ inside the first storage device ($2a$), the at least one system controller ($1a$, $5a$, $5b$) being configured to: read from the memory a first lookup table mapping thermal charges $X_1$ of the first storage device ($2a$) to first temperatures inside the first storage device ($2a$); use the first lookup table and the first coefficient of performance $COP_1$ to produce a first charging curve of the first storage device ($2a$), the first charging curve mapping amounts of power $P_1$ supplied to the first storage device ($2a$) to thermal charges $X_1$ of the first storage device ($2a$); and determine the first charge $X_1$ of the first storage device ($2a$) based on the first future demand $F_1$ of power and based on the first discharge characteristic and based on the first charging curve.

In some embodiments, the first storage device ($2a$) comprises a first heat pump, wherein the first heat pump has a first coefficient of performance $COP_1$, the first coefficient of performance $COP_1$ being a function of a first temperature $T_1$ inside the first storage device ($2a$), the at least one system controller ($1a$, $5a$, $5b$) being configured to: read from the memory a first lookup table mapping thermal charges $X_i$ of the first storage device ($2a$) to first temperatures inside the first storage device ($2a$); use the first lookup table and the first coefficient of performance $COP_1$ to produce a first charging curve of the first storage device ($2a$), the first charging curve mapping amounts of power $P_i$ supplied to the first storage device ($2a$) to thermal charges $X_i$ of the first storage device ($2a$); and calculate the first charge $X_1$ of the first storage device ($2a$) based on the first future demand $F_1$ of power and based on the first discharge characteristic and based on the first charging curve.

In some embodiments, the first storage device ($2a$) comprises a first heat pump, wherein the first heat pump has a first coefficient of performance $COP_1$, the first coefficient of performance $COP_1$ being a function of a first temperature $T_1$ inside the first storage device ($2a$), the at least one system controller ($1a$, $5a$, $5b$) being configured to: read from the memory a first lookup table mapping thermal charges $X_i$ of the first storage device ($2a$) to first temperatures inside the first storage device ($2a$); use the first lookup table and the first coefficient of performance $COP_1$ to produce a first charging curve of the first storage device ($2a$), the first charging curve mapping first amounts of power $P_i$ supplied to the first storage device ($2a$) to first thermal charges $X_i$ of the first storage device ($2a$); and determine the first charge $X_1$ of the first storage device ($2a$) based on the first future demand $F_1$ of power and based on the first discharge characteristic and based on the first charging curve.

In some embodiments, the first storage device ($2a$) comprises a first heat pump, wherein the first heat pump has a first coefficient of performance $COP_1$, the first coefficient of performance $COP_1$ being a function of a first temperature $T_1$ inside the first storage device ($2a$), the at least one system controller ($1a$, $5a$, $5b$) being configured to: read from the memory a first lookup table mapping thermal charges $X_i$ of the first storage device ($2a$) to first temperatures inside the first storage device ($2a$); use the first lookup table and the first coefficient of performance $COP_1$ to produce a first charging curve of the first storage device ($2a$), the first charging curve mapping first amounts of power $P_i$ supplied to the first storage device ($2a$) to first thermal charges $X_i$ of the first storage device ($2a$); and calculate the first charge $X_1$ of the first storage device ($2a$) based on the first future demand $F_1$ of power and based on the first discharge characteristic and based on the first charging curve.

In some embodiments, the first storage device ($2a$) comprises a heat pump, the first charge $X_1$ of the first storage device ($2a$) can be a first thermal charge $X_1$ of the first storage device ($2a$).

In some embodiments, the first storage device ($2a$) comprises a first rechargeable battery and the first discharge characteristic is a first self-discharge characteristic of the first rechargeable battery, wherein the first rechargeable battery comprises a first group of materials, wherein the at least one system controller ($1a$, $5b$) is configured to: change the first discharge characteristic as a function of the first group of materials; and estimate the first charge $X_1$ of the first storage device ($2a$) based on the first future demand $F_1$ of power and based on the changed first discharge characteristic.

In some embodiments, the system accommodates various types of rechargeable batteries by mapping their materials to discharge characteristics, the system becomes more versatile. That is, the self-discharge characteristics of various types of electric batteries can be taken into consideration.

In some embodiments, the first storage device ($2a$) is configured to store electric energy and comprises a first rechargeable battery and the first discharge characteristic is a first self-discharge characteristic of the first rechargeable battery, wherein the first rechargeable battery comprises a first group of materials, wherein the at least one system controller ($1a$, $5a$, $5b$) is configured to: change the first discharge characteristic as a function of the first group of materials; and determine the first charge $X_1$ of the first storage device ($2a$) based on the first future demand $F_1$ of power and based on the changed first discharge characteristic.

In some embodiments, the first storage device ($2a$) is configured to store electric energy and comprises a first rechargeable battery and the first discharge characteristic is a first self-discharge characteristic of the first rechargeable battery, wherein the first rechargeable battery comprises a first group of materials, wherein the at least one system controller ($1a$, $5a$, $5b$) is configured to: change the first discharge characteristic as a function of the first group of materials; and calculate the first charge $X_1$ of the first storage device ($2a$) based on the first future demand $F_1$ of power and based on the changed first discharge characteristic.

In some embodiments, the first discharge characteristic is changed by the at least one system controller ($1a$, $5a$, $5b$) being configured to: read from the memory a materials lookup table mapping groups of materials to self-discharge characteristics, and change the first discharge characteristic as a function of the first group of materials by using the materials lookup table to look up a first discharge characteristic for the first group of materials.

In some embodiments, the first storage device ($2a$) is configured to store electric energy and comprises a first rechargeable battery and the first discharge characteristic is a first self-discharge characteristic of the first rechargeable battery, wherein the first rechargeable battery comprises a first group of materials, wherein the at least one system controller ($1a$, $5a$, $5b$) is configured to: determine the first discharge characteristic as a function of the first group of materials; and determine the first charge $X_1$ of the first storage device ($2a$) based on the first future demand $F_1$ of power and based on the determined first discharge characteristic.

In some embodiments, the first storage device ($2a$) is configured to store electric energy and comprises a first rechargeable battery and the first discharge characteristic is a first self-discharge characteristic of the first rechargeable battery, wherein the first rechargeable battery comprises a first group of materials, wherein the at least one system controller ($1a$, $5a$, $5b$) is configured to: determine the first discharge characteristic as a function of the first group of materials; and calculate the first charge $X_1$ of the first storage device ($2a$) based on the first future demand $F_1$ of power and based on the determined first discharge characteristic.

In some embodiments, the first discharge characteristic is determined by the at least one system controller ($1a$, $5a$, $5b$) being configured to: read from the memory a materials lookup table mapping groups of materials to self-discharge characteristics; and determine the first discharge characteristic as a function of the first group of materials by using the materials lookup table to look up a first discharge characteristic for the first group of materials.

In some embodiments, the system includes a first storage device ($2a$) comprising a heat pump, the system comprising a second storage device ($2b$) having a second discharge characteristic, the second storage device ($2b$) comprising a second rechargeable battery, the system comprising a second switch for electrically connecting the second storage device ($2b$) to the at least one local supply of renewable power ($6a$, $6b$, $6c$), the at least one system controller ($1a$, $1b$, $5a$, $5b$) being in operative communication with the second switch, the at least one system controller ($1a$, $1b$, $5a$, $5b$) being configured to: if the first charge $X_1$ is less than the sum of the first future demand $F_1$ and the predetermined margin: read from the memory a second time history of past activations of the second storage device ($2b$); estimate a second future demand $F_2$ of power based on the second time history of past activations; estimate a second charge $X_2$ of the second storage device ($2b$) based on the second future demand $F_2$ of power and based on the second discharge characteristic; compare the second charge $X_2$ to the second future demand $F_2$ of power; and if the second charge $X_2$ is larger than the second future demand $F_2$ of power by the predetermined margin: electrically connect the at least one local supply of renewable power ($6a$, $6b$, $6c$) to the second storage device ($2b$) by closing the second switch.

By handling more than one storage device ($2a$, $2b$), the system becomes more effective at using power from the at least one local supply of renewable power ($6a$, $6b$, $6c$).

In some embodiments, the at least one system controller ($1a$, $1b$, $5b$) is configured to: compare the second charge $X_2$ to the second future demand $F_2$ of power; and if the second charge $X_2$ is larger than the second future demand $F_2$ of power by the predetermined margin: produce a second signal and send the second signal to the second switch, the second signal causing the second switch to electrically connect the at least one local supply of renewable power ($6a$, $6b$, $6c$) to the second storage device ($2b$).

In some embodiments, the second future demand $F_2$ of power is determined based on the second time history of past activations. In some embodiments, the second future demand $F_2$ of power is calculated based on the second time history of past activations.

In some embodiments, the second charge $X_2$ of the second storage device (2b) is determined based on the second future demand $F_2$ of power and based on the second discharge characteristic of the second storage device (2b). In some embodiments, the second charge $X_2$ of the second storage device (2b) is calculated based on the second future demand $F_2$ of power and based on the second discharge characteristic of the second storage device (2b).

In some embodiments, the system includes a second storage device (2b), wherein the second discharge characteristic is a second self-discharge characteristic of the second rechargeable battery, wherein the second rechargeable battery comprises a second group of materials, wherein the at least one system controller (1a, 1b, 5a, 5b) is configured to: change the second discharge characteristic as a function of the second group of materials; and estimate the second charge $X_2$ of the second storage device (2b) based on the second future demand $F_2$ of power and based on the changed second discharge characteristic.

By handling more than one type of storage device (2a, 2b), the system becomes more effective at using power from the at least one local supply of renewable power (6a, 6b, 6c). That is, power that cannot be stored in a thermal storage device (2a, 2b) can instead be stored in an electric storage device (2b, 2a), or vice versa.

In some embodiments, the second storage device (2b) is configured to store electric energy and comprises a second rechargeable battery and the second discharge characteristic is a second self-discharge characteristic of the second rechargeable battery, wherein the second rechargeable battery comprises a second group of materials, wherein the at least one system controller (1a, 1b, 5b) is configured to: change the second discharge characteristic as a function of the second group of materials; and determine the second charge $X_2$ of the second storage device (2b) based on the second future demand $F_2$ of power and based on the changed second discharge characteristic.

In some embodiments, the second storage device (2b) is configured to store electric energy and comprises a second rechargeable battery and the second discharge characteristic is a second self-discharge characteristic of the second rechargeable battery, wherein the second rechargeable battery comprises a second group of materials, wherein the at least one system controller (1a, 1b, 5b) is configured to: change the second discharge characteristic as a function of the second group of materials; and calculate the second charge $X_2$ of the second storage device (2b) based on the second future demand $F_2$ of power and based on the changed second discharge characteristic.

In some embodiments, the second discharge characteristic is changed by the at least one system controller (1a, 1b, 5a, 5b) being configured to: read from the memory a materials lookup table mapping groups of materials to self-discharge characteristics; and change the second discharge characteristic as a function of the second group of materials by using the materials lookup table to look up a second discharge characteristic for the second group of materials.

In some embodiments, the second storage device (2b) is configured to store electric energy and comprises a second rechargeable battery and the second discharge characteristic is a second self-discharge characteristic of the second rechargeable battery, wherein the second rechargeable battery comprises a second group of materials, wherein the at least one system controller (1a, 1b, 5b) is configured to: determine the second discharge characteristic as a function of the second group of materials; and determine the second charge $X_2$ of the second storage device (2b) based on the second future demand $F_2$ of power and based on the determined second discharge characteristic.

In some embodiments, the second storage device (2b) is configured to store electric energy and comprises a second rechargeable battery and the second discharge characteristic is a second self-discharge characteristic of the second rechargeable battery, wherein the second rechargeable battery comprises a second group of materials, wherein the at least one system controller (1a, 1b, 5b) is configured to: determine the second discharge characteristic as a function of the second group of materials; and calculate the second charge $X_2$ of the second storage device (2b) based on the second future demand $F_2$ of power and based on the determined second discharge characteristic.

In some embodiments, the second discharge characteristic is determined by the at least one system controller (1a, 1b, 5a, 5b) being configured to: read from the memory a materials lookup table mapping groups of materials to self-discharge characteristics; and determine the second discharge characteristic as a function of the second group of materials by using the materials lookup table to look up a second discharge characteristic for the second group of materials.

In some embodiments, the system includes a first rechargeable battery, the system comprising a second storage device (2b) having a second discharge characteristic, the second storage device (2b) comprising a second heat pump, the system comprising a second switch for electrically connecting the second storage device (2b) to the at least one local supply of renewable power (6a, 6b, 6c), the at least one system controller (1a, 1b, 5a, 5b) being in operative communication with the second switch, the at least one system controller (1a, 1b, 5a, 5b) being configured to: if the first charge $X_1$ is less than the sum of the first future demand F/and the predetermined margin: read from the memory a second time history of past activations of the second storage device (2b); estimate a second future demand $F_2$ of power based on the second time history of past activations; estimate a second charge $X_2$ of the second storage device (2b) based on the second future demand $F_2$ of power and based on the second discharge characteristic; compare the second charge $X_2$ to the second future demand $F_2$ of power; and if the second charge $X_2$ is larger than the second future demand $F_2$ of power by the predetermined margin, electrically connect the at least one local supply of renewable power (6a, 6b, 6c) to the second storage device (2b) by closing the second switch.

By handling more than one storage device (2a, 2b), the system becomes more effective at using power from the at least one local supply of renewable power (6a, 6b, 6c).

In some embodiments, the at least one system controller (1a, 1b, 5b) is configured to: compare the second charge $X_2$ to the second future demand $F_2$ of power; and if the second charge $X_2$ is larger than the second future demand $F_2$ of power by the predetermined margin, produce a second signal and send the second signal to the second switch, the second signal causing the second switch to electrically connect the at least one local supply of renewable power (6a, 6b, 6c) to the second storage device (2b).

In some embodiments, the system involves a second future demand $F_2$ and involving a second heat pump, wherein the second heat pump has a second coefficient of performance $COP_2$, the second coefficient of performance $COP_2$ being a function of a second temperature $T_2$ inside the second storage device (2b), the at least one system controller (1a, 1b, 5a, 5b) being configured to: read from the memory a second lookup table mapping thermal charges $X_i$ of the second storage device (2b) to second temperatures inside the second storage device (2b); use the second lookup table and the second coefficient of performance $COP_2$ to produce a second charging curve of the second storage device (2b), the second charging curve mapping amounts of power $P_i$ supplied to the second storage device (2b) to thermal charges $X_i$ of the second storage device (2b); and estimate the second charge $X_2$ of the second storage device (2b) based on the second future demand $F_2$ of power and based on the second discharge characteristic and based on the second charging curve. By handling more than one type of storage device (2a, 2b), the system becomes more effective at using power from the at least one local supply of renewable power (6a, 6b, 6c). That is, power that cannot be stored in an electric storage device (2a, 2b) can be stored in a thermal storage device (2b, 2a).

In some embodiments, the second heat pump has a second coefficient of performance $COP_2$, the second coefficient of performance $COP_2$ being a function of a second temperature $T_2$ inside the second storage device (2b), the at least one system controller (1a, 1b, 5a, 5b) being configured to: read from the memory a second lookup table mapping thermal charges $X_i$ of the second storage device (2b) to second temperatures inside the second storage device (2b); use the second lookup table and the second coefficient of performance $COP_2$ to produce a second charging curve of the second storage device (2b), the second charging curve mapping amounts of power $P_i$ supplied to the second storage device (2b) to thermal charges $X_i$ of the second storage device (2b); and determine the second charge $X_2$ of the second storage device (2b) based on the second future demand $F_2$ of power and based on the second discharge characteristic and based on the second charging curve.

In some embodiments, the second heat pump has a second coefficient of performance $COP_2$, the second coefficient of performance $COP_2$ being a function of a second temperature $T_2$ inside the second storage device (2b), the at least one system controller (1a, 1b, 5b) being configured to: read from the memory a second lookup table mapping thermal charges $X_i$ of the second storage device (2b) to second temperatures inside the second storage device (2b); use the second lookup table and the second coefficient of performance $COP_2$ to produce a second charging curve of the second storage device (2b), the second charging curve mapping amounts of power $P_i$ supplied to the second storage device (2b) to thermal charges $X_i$ of the second storage device (2b); and calculate the second charge $X_2$ of the second storage device (2b) based on the second future demand $F_2$ of power and based on the second discharge characteristic and based on the second charging curve.

In some embodiments, the second heat pump has a second coefficient of performance $COP_2$, the second coefficient of performance $COP_2$ being a function of a second temperature $T_2$ inside the second storage device (2b), the at least one system controller (1a, 1b, 5b) being configured to: read from the memory a second lookup table mapping thermal charges $X_i$ of the second storage device (2b) to second temperatures inside the second storage device (2b); use the second lookup table and the second coefficient of performance $COP_2$ to produce a second charging curve of the second storage device (2b), the second charging curve mapping second amounts of power $P_i$ supplied to the second storage device (2b) to second thermal charges $X_i$ of the second storage device (2b); and determine the second charge $X_2$ of the second storage device (2b) based on the second future demand $F_2$ of power and based on the second discharge characteristic and based on the second charging curve.

In some embodiments, the second heat pump has a second coefficient of performance $COP_2$, the second coefficient of performance $COP_2$ being a function of a second temperature $T_2$ inside the second storage device (2b), the at least one system controller (1a, 1b, 5b) being configured to: read from the memory a second lookup table mapping thermal charges $X_i$ of the second storage device (2b) to second temperatures inside the second storage device (2b); use the second lookup table and the second coefficient of performance $COP_2$ to produce a second charging curve of the second storage device (2b), the second charging curve mapping second amounts of power $P_i$ supplied to the second storage device (2b) to second thermal charges $X_i$ of the second storage device (2b); and calculate the second charge $X_2$ of the second storage device (2b) based on the second future demand $F_2$ of power and based on the second discharge characteristic and based on the second charging curve. Where the second storage device (2b) comprises a heat pump, the second charge $X_2$ of the second storage device (2b) can be a second thermal charge $X_2$ of the second storage device (2b).

In some embodiments, the at least one system controller (1a, 1b, 5b) is configured to: connect to a weather forecast controller, the weather forecast controller being located remotely from the at least one system controller (1a, 1b, 5a, 5b); receive weather forecast data from the weather forecast controller; and estimate the second future demand $F_2$ of power based on the second time history of past activations and based on the weather forecast data. The weather forecast affords a more accurate estimate or determination or calculation of the second future demand $F_2$ of power. The weather forecast data are preferably indicative of a weather forecast at the at least one local supply of renewable power (6a, 6b, 6c).

In some embodiments, the at least one system controller (1a, 1b, 5b) is configured to: connect to a weather forecast controller, least one system controller (1a, 1b, 5a, 5b); receive weather forecast data from the weather forecast controller; and determine the second future demand $F_2$ of power based on the second time history of past activations and based on the weather forecast data.

In some embodiments, the at least one system controller (1a, 1b, 5b) is configured to: connect to a weather forecast controller, the weather forecast controller being located remotely from the at least one system controller (1a, 1b, 5a, 5b); receive weather forecast data from the weather forecast controller; and calculate the second future demand $F_2$ of power based on the second time history of past activations and based on the weather forecast data.

In some embodiments, a method includes: receiving from the at least one local supply of renewable power (6a, 6b, 6c) a signal indicative of available power; in response to the signal indicative of available power, reading from a memory a first time history of past activations of a first storage device (2a); estimating a first future demand $F_1$ of power based on the first time history of past activations; estimating a first charge $X_1$ of the first storage device (2a) based on the first future demand $F_1$ of power and based on a first discharge characteristic of the first storage device (2a); comparing the first charge $X_1$ to the first future demand $F_1$ of power; and if the first charge $X_1$ is larger than the first future demand $F_1$ of power by a predetermined margin: producing a first signal and sending the first signal to a first switch, the first signal causing the first switch to electrically connect the at least one local supply of renewable power (6a, 6b, 6c) to the first storage device (2a).

In some embodiments, the first future demand $F_1$ of power is determined based on the first time history of past activations. In some embodiments, the first future demand $F_1$ of power is calculated based on the first time history of past activations.

In some embodiments, the first charge $X_1$ of the first storage device (2a) is determined based on the first future demand $F_1$ of power and based on the first discharge characteristic of the first storage device (2a). In some embodiments, the first charge $X_1$ of the first storage device (2a) is calculated based on the first future demand $F_1$ of power and based on the first discharge characteristic of the first storage device (2a).

In some embodiments, the method includes: if the first charge $X_1$ is less than the sum of the first future demand $F_1$ and the predetermined margin: reading from the memory a second time history of past activations of a second storage device (2b); estimating a second future demand $F_2$ of power based on the second time history of past activations; estimating a second charge $X_2$ of the second storage device (2b) based on the second future demand $F_2$ of power and based on the second discharge characteristic; comparing the second charge $X_2$ to the second future demand $F_2$ of power; and if the second charge $X_2$ is larger than the second future demand $F_2$ of power by the predetermined margin, producing a second signal and sending the second signal to a second switch, the second signal causing the second switch to electrically connect the at least one local supply of renewable power (6a, 6b, 6c) to the second storage device (2b).

By handling more than one storage device (2a, 2b), the system becomes more effective at using power from the at least one local supply of renewable power (6a, 6b, 6c). In some embodiments, the first storage device (2a) stores electric energy while the second storage device (2b) stores thermal energy, or vice versa.

In some embodiments, the second future demand $F_2$ of power is determined based on the second time history of past activations. In some embodiments, the second future demand $F_2$ of power is calculated based on the second time history of past activations.

In some embodiments, the second charge $X_2$ of the second storage device (2b) is determined based on the second future demand $F_2$ of power and based on the second discharge characteristic of the second storage device (2b). In some embodiments, the second charge $X_2$ of the second storage device (2b) is calculated based on the second future demand $F_2$ of power and based on the second discharge characteristic of the second storage device (2b).

It should be understood that the foregoing relates only to certain embodiments of the disclosure. Numerous changes can be made therein without departing from the scope of the disclosure as defined by the following claims. It should also be understood that the disclosure is not restricted to the illustrated embodiments. Various modifications can be made within the scope of the claims.

REFERENCE NUMERALS 1a, 1b controllers
2a, 2b storage devices
3, 4 busses
5b system controllers 6a, 6b, 6c local supply of renewable power
7 local grid
8 weather forecast service

The invention claimed is:

1. A system comprising
a local supply of renewable power;
a first storage device having a first discharge characteristic;
a first switch for electrically connecting the first storage device to the local supply of renewable power;
a system controller having a memory in operative communication with the first switch and with the local supply of renewable power, the system controller configured to:
    receive from the local supply of renewable power a signal indicative of available power;
    in response to the signal indicative of available power, read from the memory a first time history of past activations of the first storage device;
    estimate a first future demand of power based on the first time history of past activations;
    estimate a first charge of the first storage device based on the first future demand of power and the first discharge characteristic;
    compare the first charge to the first future demand of power; and
    if the first charge is larger than the first future demand of power by a predetermined margin, electrically connect the local supply of renewable power to the first storage device by closing the first switch;
the first storage device comprises a first heat pump;
the first heat pump has a first coefficient of performance being a function of a first temperature inside the first storage device; and
the system controller is further configured to:
read from the memory a first lookup table mapping thermal charges of the first storage device to first temperatures inside the first storage device;
use the first lookup table and the first coefficient of performance to produce a first charging curve of the first storage device mapping amounts of power supplied to the first storage device to thermal charges of the first storage device; and
estimate the first charge of the first storage device based on the first future demand of power and based on the first discharge characteristic and based on the first charging curve.

2. The system according to claim 1, wherein the system controller is further configured to:
connect to a weather forecast controller located remotely from the system controller;
receive weather forecast data from the weather forecast controller; and
estimate the first future demand of power based on the first time history of past activations and based on the weather forecast data.

3. The system according to claim 1, further comprising:
a connector to a power grid; and
a grid switch for electrically connecting the local supply of renewable power to the connector;
wherein the system controller is in operative communication with the grid switch and is configured to, if the first charge is less than the sum of the first future demand and the predetermined margin, electrically connect the at least one local supply of renewable power to the power grid by closing the grid switch.

4. The system according to claim 1, further comprising a second storage device comprising a first rechargeable battery; and a second discharge characteristic comprises a second self-discharge characteristic of the first rechargeable battery comprising a first group of materials;

the system controller is further configured to:

change the second discharge characteristic as a function of the first group of materials; and estimate the second charge of the second storage device based on the first future demand of power and the changed second discharge characteristic.

5. The system according to claim 1, further comprising:

a second storage device having a second discharge characteristic, the second storage device comprising a second rechargeable battery;

a second switch for electrically connecting the second storage device to the local supply of renewable power, the system controller in operative communication with the second switch;

the system controller further configured to, if the first charge X1 is less than the sum of the first future demand F1 and the predetermined margin:

read from the memory a second time history of past activations of the second storage device;

estimate a second future demand of power based on the second time history of past activations;

estimate a second charge of the second storage device based on the second future demand of power and based on the second discharge characteristic;

compare the second charge to the second future demand of power; and if the second charge is larger than the second future demand of power by the predetermined margin, electrically connect the at least one local supply of renewable power to the second storage device by closing the second switch.

6. The system according to claim 5, wherein:

the second discharge characteristic is a second self-discharge characteristic of the second rechargeable battery;

the second rechargeable battery comprises a second group of materials;

the system controller is further configured to:

change the second discharge characteristic as a function of the second group of materials; and estimate the second charge of the second storage device based on the second future demand of power and based on the changed second discharge characteristic.

7. The system according to claim 4, further comprising:

a second storage device having a second discharge characteristic, the second storage device comprising a second heat pump;

a second switch for electrically connecting the second storage device to the local supply of renewable power, the system controller in operative communication with the second switch;

the system controller further configured to, if the first charge is less than the sum of the first future demand and the predetermined margin:

read from the memory a second time history of past activations of the second storage device;

estimate a second future demand of power based on the second time history of past activations;

estimate a second charge of the second storage device based on the second future demand of power and based on the second discharge characteristic;

compare the second charge to the second future demand of power; and if the second charge is larger than the second future demand of power by the predetermined margin, electrically connect the local supply of renewable power to the second storage device by closing the second switch.

8. The system according to claim 7, wherein:

the second heat pump has a second coefficient of performance being a function of a second temperature inside the second storage device; and the system controller is further configured to:

read from the memory a second lookup table mapping thermal charges of the second storage device to second temperatures inside the second storage device;

use the second lookup table and the second coefficient of performance to produce a second charging curve of the second storage device, the second charging curve mapping amounts of power supplied to the second storage device to thermal charges of the second storage device; and estimate the second charge of the second storage device based on the second future demand of power and based on the second discharge characteristic and based on the second charging curve.

9. The system according to claim 5, wherein the system controller is further configured to:

connect to a weather forecast controller located remotely from the system controller;

receive weather forecast data from the weather forecast controller; and estimate the second future demand of power based on the second time history of past activations and based on the weather forecast data.

10. A method of using power from a local supply of renewable power, the method comprising:

receiving from the local supply of renewable power a signal indicative of available power;

in response to the signal indicative of available power, reading from a memory a first time history of past activations of a first storage device;

estimating a first future demand of power based on the first time history of past activations;

estimating a first charge of the first storage device based on the first future demand of power and a first discharge characteristic of the first storage device;

comparing the first charge to the first future demand of power; and if the first charge is larger than the first future demand of power by a predetermined margin, producing a first signal and sending the first signal to a first switch, the first signal causing the first switch to electrically connect the local supply of renewable power to the first storage device;

wherein the first storage device comprises a first heat pump;

the first heat pump has a first coefficient of performance being a function of a first temperature inside the first storage device; and the system controller is further configured to:

read from the memory a first lookup table mapping thermal charges of the first storage device to first temperatures inside the first storage device;

use the first lookup table and the first coefficient of performance to produce a first charging curve of the first storage device mapping amounts of power supplied to the first storage device to thermal charges of the first storage device; and estimate the first charge of the first storage device based on the first future demand of power and based on the first discharge characteristic and based on the first charging curve.

11. The method according to claim 10, further comprising, if the first charge is less than the sum of the first future demand and the predetermined margin:

reading from the memory a second time history of past activations of a second storage device;

estimating a second future demand of power based on the second time history of past activations;

estimating a second charge of the second storage device based on the second future demand of power and based on the second discharge characteristic;

comparing the second charge to the second future demand of power; and if the second charge is larger than the second future demand of power by the predetermined margin, producing a second signal and sending the second signal to a second switch, the second signal causing the second switch to electrically connect the local supply of renewable power to the second storage device.

\*　\*　\*　\*　\*